(No Model.) 2 Sheets—Sheet 1.

J. W. McKAY.
DOUGH DIVIDING MACHINE.

No. 545,636. Patented Sept. 3, 1895.

Witnesses

Inventor
Jas. W. McKay (No Model.) 2 Sheets—Sheet 2.

J. W. McKAY.
DOUGH DIVIDING MACHINE.

No. 545,636. Patented Sept. 3, 1895.

Witnesses
Geo. M. Mayer
Bowdidge

Inventor
Jas. W. McKay

UNITED STATES PATENT OFFICE.

JAMES W. McKAY, OF CHICAGO, ILLINOIS.

DOUGH-DIVIDING MACHINE.

SPECIFICATION forming part of Letters Patent No. 545,636, dated September 3, 1895.

Application filed March 26, 1895. Serial No. 543,246. (No model.)

*To all whom it may concern:*

Be it known that I, JAMES W. MCKAY, a citizen of the United States, residing at Chicago, in the county of Cook and State of Illinois, have invented certain new and useful Improvements in Dough-Dividing Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for dividing bodies of bakers' dough into equal parts, and has for its object the combination of certain mechanical elements adapted to take definite portions from the main bulk of the plastic material acted upon and to segregate such portions, with devices for varying their size when desired.

My invention consists, essentially, of the common hopper and box for receiving and holding the dough, with a revoluble spiral blade within the box for kneading and serving the material to a rotative chambered block. The chambers of the block are suitably presented for the reception of the dough, and they can be varied in size by covering part of the length of the block with a hollow split cylindrical piece, so formed interiorly as to closely fit the block upon all sides. Provision is made for positively removing the divisions of material at such intervals of time as to permit them to fall separately upon a traveling belt and at a certain distance one from the other.

My invention is simple in character, and the details of construction and operation will be readily followed in the description set out below.

Figure 1:
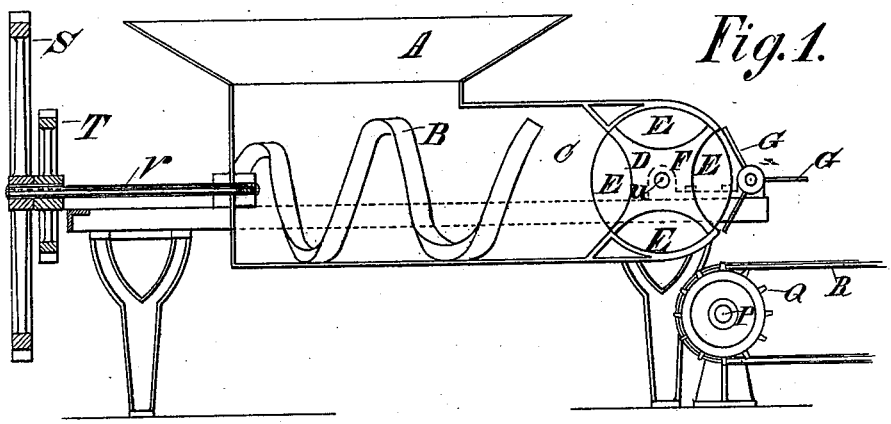
Figure 2:
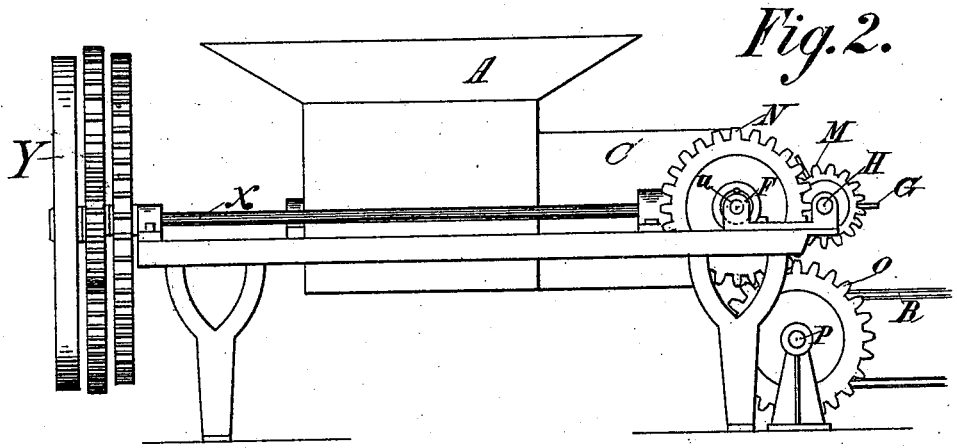
Figure 3:
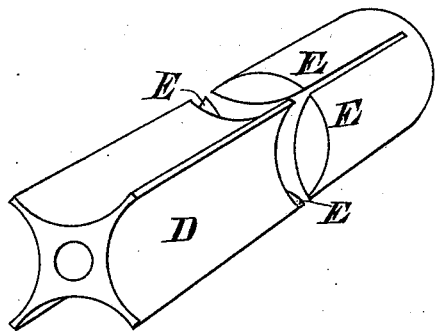
Figure 4:
Figure 5:
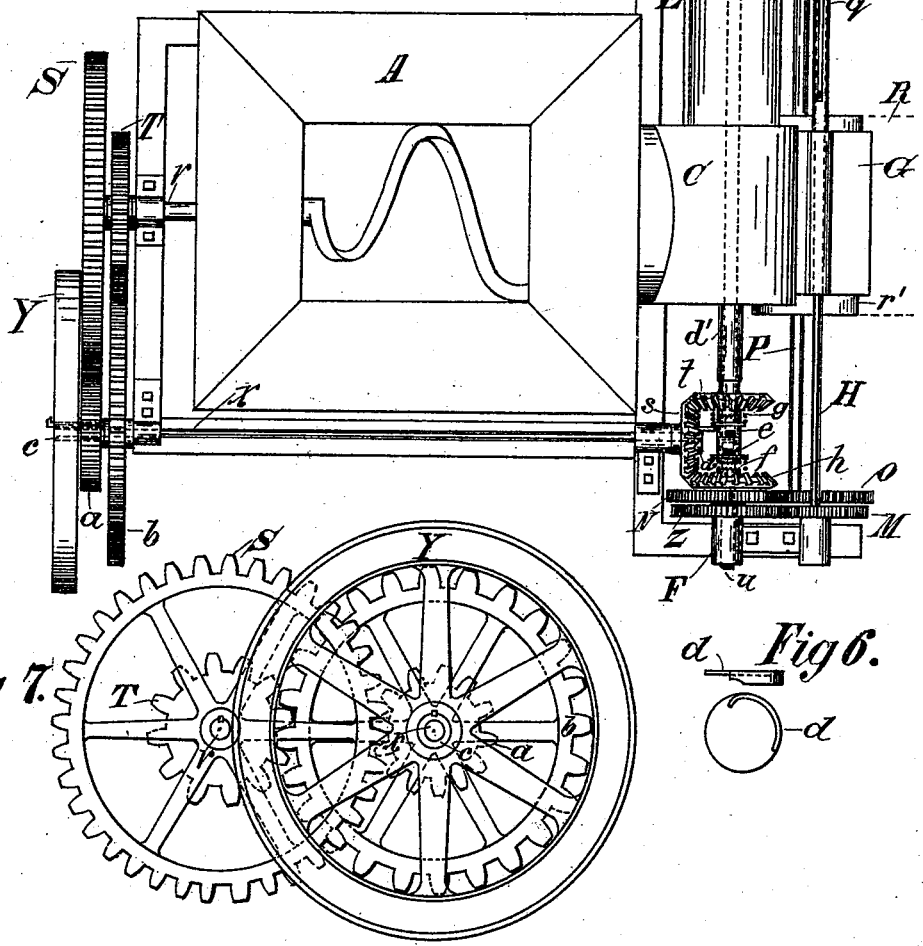
Figure 7:
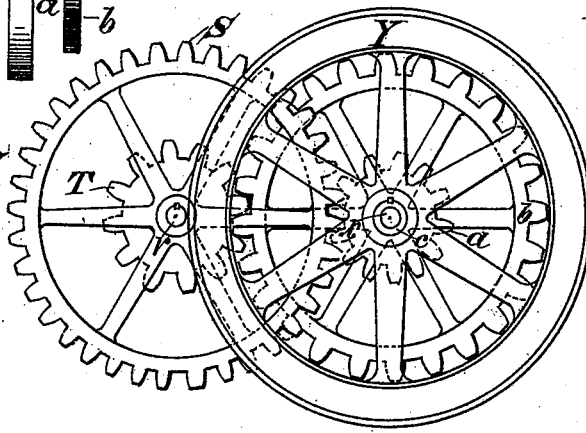
Figure 6:

Referring to the accompanying drawings, wherein like letters represent like parts in the several views, Figure 1 is a vertical longitudinal mid-section view. Fig. 2 shows a side elevation. Fig. 3 shows the chambered block and the split cylindrical piece adapted to closely fit about the block. Fig. 4 shows a disk notched at quadrantal points for the reception of a spring-catch to limit the arc through which the chambered block and its attachments turn in each step of their intermittent rotatory motion. Fig. 5 is a top plan of the machine. Fig. 6 presents the form of the cam which operates the two clutches upon the main cross-shaft of the machine, and Fig. 7 is an outline drawing of the combined band and fly wheel, with the driving-gear for the longitudinal shafts.

Figs. 1 and 2 represent the interior and exterior of the hopper A and the dough-box and guideway C, the upper and lower walls of which curve at one end to follow for a distance the cylindrical area described by the rotation of the block D. Offsets within the box C continue inside the cylindrical curve of the upper and lower walls, leaving a space between them approximately equal in width to the chambers of the block D. One of the side walls of the box C closes the cylindrical area, with the exception of a central orifice leading to a journal-box $d'$, projecting from the exterior of the said wall and affording a bearing for a shaft to be hereinafter described. In the opposite side wall of the box C a circular space is left open for the introduction of the hollow split cylindrical piece E, sleeved upon the shaft which carries the block D. It will be readily seen that as the piece E is slipped over the block D the chambers of the latter are reduced in size. Within the box C a helical or screw-shaped blade B is made to revolve, acting in the usual manner as a kneader, as well as forcing the dough toward and into such parts of the chambers of the block D as may not be occupied by the divisions of the piece E. This operation is a common one, and it is believed to be set out in the drawings with sufficient clearness.

F represents a bearing upon the supporting frame of the machine for a short shaft in line with that carrying the block D and which will be again referred to.

G marks a fan-like scraper, possessing three blades as ordinarily constructed. These blades are of similar form and length, and as the scraper revolves with its special shaft each blade enters and removes the contents of one of the chambers of the block D, the parts occupying suitable relative positions, as best shown in Fig. 1.

H marks the shaft imparting motion to the scraper G, which is not fixed directly upon the shaft H, but is keyed to a sleeve $q$, borne by the said shaft and movable longitudinally thereupon. The sleeve $q$ is provided with a slot cut lengthwise, and entering and traveling this slot is a pin or lug projecting from the shaft H, thus securing the revolution of the scraper G, while permitting it to be passed along the shaft H and to preserve its original position with respect to the piece E. The block D is fixed upon the shaft $i$ and the piece E is sleeved upon the same shaft. The shaft $i$ is journaled in the bearings $d'$, projecting from the side of the box C, and in the casting $m'$, attached to the main frame of the machine. The shaft $i$ cannot move longitudinally, being held in position by the lug $n'$ acting upon the inner side of the casting $m'$ and the end of an abutting shaft $u$. Near one end of the shaft $i$ are located the nuts $l$, exactly alike, engaging a thread cut upon or into the shaft. The cross-head $j$ is loose upon the shaft $i$, and between it and the adjacent nut $l$ a washer $k$ is placed to reduce the wear of the essential parts. Two rods $n$ and $m$ are situated parallel to each other and are attached at one extremity of each to opposite ends of the cross-head $j$. The said rods pass through guiding orifices bored in the casting $m'$ and terminate and are fixed upon a ring $v$, the diameters of which lie in a plane at right angles with that containing the axes of the rods $m$ and $n$. The ring $v$ occupies an annular recess in a second ring $o$, thicker and larger than the first. The second ring $o$ is fast upon a third ring or disk $w$, of still greater diameter than the others, and it is attached to the outer end of the piece E, the axis of which passes through the center of the three rings. It will be observed, Fig. 5, that the third ring $w$ is large enough to permit its edge to enter an annular groove in a fourth ring $r$, concentric with and fixed upon the sleeve $q$. This contact is not a binding one and no rotative effect is produced by one shaft upon the other acting through this connection. At the extreme outer end of the shaft $i$ is fixed the disk $y$, notched at four points equally distant from each other for the reception of the spring-catch $z$, best shown in Fig. 4, attached to the main frame of the machine. The rotation of the block D and its attachments takes place by steps of one quarter-turn at a time and the ratchet mechanism is needed to prevent the block D from being carried too far by its momentum. The mouths of the chambers are by this means caused to register with the vent of the box C, through which the dough reaches them.

Power is applied to my machine upon the band fly-wheel Y, Figs. 2, 5, and 7. The wheel Y and the gear-wheel $a$ are both fast upon the sleeve $c$, borne upon the extremity of the shaft $x$. The gear-wheel $a$ meshes with and operates the gear-wheel S, which turns the shaft V; also fixed upon the shaft V is the gear-wheel T, which meshes with and drives the gear-wheel $b$ and the shaft $x$. These driving-wheels are related in diameter in accordance with the rate of movement expected of the various parts, and the sizes of the driving-wheels may be varied to suit the work. The office of the shaft V is simply to revolve the helical blade B, Fig. 1, and needs no further description. It rests in suitable bearings attached to the frame of the machine and to the box C. The shaft $x$, also journaled in the main frame, terminates at one end in the bevel gear-wheel $s$, meshing with similar wheels $t$ and $h$, borne by sleeves loose upon the shafts $i$ and $u$, respectively. The three bevel gear-wheels revolve continuously, the sleeve carrying the wheel $h$, bearing also the gear-wheel N, which meshes with the gear-wheel O, the latter being fixed upon a shaft P at right angles with the shaft $x$ and journaled in standards ordinarily separated from the frame of the machine and rising from the floor beneath it. The shaft P bears also a roller $r'$, upon which is a belt R, passing around a second roller similar to that represented by $r'$ and like it suitably supported and adapted to rotate at a distance from the machine proper. To insure positive travel of the belt R, the shafts bearing the rollers are further provided with sprocket-wheels, as Q, upon the shaft P, and a chain connects them in the common manner. The belt R moves continuously, and it is so situated as to pass below the point from which the portions of dough fall from the chambers of the block D under the influence of gravity and the scraper G. It is my practice to glaze or enamel the exterior of the block D and the interior of the piece E, and this protection may be extended to other surfaces brought in contact with the dough, if found desirable. This treatment of the block D prevents the pieces of dough from too strongly adhering thereto and aids the regular and proper disposal of them.

Returning to the bevel gear-wheel $s$, Fig. 5, it will be noticed that it is provided upon the exposed side with a disk $d$ having the same center, the disk possessing a raised edge along part of its periphery perpendicular to the plane of the disk and of the form shown in Fig. 6. Revolving with the wheel $s$ the raised edge of the disk or cam $d$ alternately meets two rings fixed upon and encircling two abutting sleeves $e$ of similar construction. One of the sleeves $e$ surrounds the extremity of the shaft $i$ and the other fits the short shaft $u$ journaled in the bearing F upon the main frame in a direct line with the shaft $i$. One end of both the sleeves $e$ is notched and presented to correspondingly notched ends of the sleeves carrying the bevel gear-wheels $g$ and $h$. Positive clutching-surfaces are thus provided. The said sleeves $e$ are movable along but not around their respective shafts, and each is provided with a lengthwise slot which is entered and traveled by a pin or lug projecting from the shaft. The cam $d$ brings the pairs of clutching-surfaces together alternately, and it is only during these contacts that the shafts *i* and *u* rotate. As at present constructed, the gearing described is arranged to give one quarter-turn to the shaft *i* and one-third of a revolution to the shaft H, sleeve *q*, and scraper G by means of the gear-wheel Z, keyed to the shaft *u*, and the gear-wheel M, which operates the shaft H. Spiral springs, acting between the wheels *g* and *h* and the outer surfaces of the rings encircling the clutch-sleeves *e*, keep the said sleeves in contact with each other and assist in promptly releasing the clutching-surfaces, thus arresting the motion of the parts at the points desired.

The size of the divisions of dough being determined, the block D is covered as far as desired by the piece E. To accomplish this movement the outer nut *l* is loosened and the cross-head *j* advanced by screwing up the inner nut *l*. Through the connection between the disk *w* and the ring *r* upon the sleeve *q* the scraper G moves equally with the advancing-piece E, and the blades of the scraper will always clear the end of the said piece E to whatever extent it may be brought forward to cover the block D. The action of the blade B fills the chambers as presented, and the step-by-step rotation brings each in position to be cleared by the scraper G, the portions of dough falling upon the belt R at certain distances apart, as previously explained.

Having thus described my invention, what I claim is—

1. In a dough dividing machine, the combination with the dough serving mechanism of the chambered receptacle revoluble step by step upon a horizontal shaft, and adjustable devices for varying the size of the said chambers by wholly occupying portions thereof substantially as shown and described.

2. In a dough dividing machine, the combination with the dough serving mechanism of the chambered receptacle revoluble upon a horizontal shaft suitably journaled and operated, adjustable devices for varying the size of the said chambers by wholly occupying portions thereof, and a revoluble scraper adapted to enter the said chambers and remove their contents, substantially as and for the purposes shown and described.

3. In a dough dividing machine, the combination with the dough serving mechanism of a chambered receptacle revoluble upon a horizontal shaft suitably journaled, adjustable devices for varying the size of the said chambers by wholly occupying portions thereof, a revoluble scraper adapted to enter the said chambers in turn and to remove their contents, and gearing by which the said chambered receptacle and the said revoluble scraper are relatively rotated, substantially as and for the purposes shown and described.

4. In a dough dividing machine, the combination with the dough kneading and serving mechanism of a set of chambers arranged mouths outwardly about a central shaft suitably journaled, each of the said chambers having an open end, the hollow cylindrical piece possessing interior divisions corresponding to the said chambers in number and form, the said cylindrical piece being adjustable to cover and occupy more or less of the said set of chambers, a revoluble scraper adapted to enter each of the said chambers in turn and to remove its contents, gearing and clutches by which the said set of chambers and the said scraper are alternately rotated, the whole substantially as and for the purposes shown and described.

5. In a dough dividing machine, the combination with the kneading and serving mechanism of a set of chambers approximately equal in area at their mouths and arranged mouths outwardly about a central shaft suitably journaled, each of the said chambers having an open end, the hollow, cylindrical piece possessing interior divisions corresponding to the said chambers in number and form, the said cylindrical piece being adjustable to cover and occupy more or less of the said set of chambers, a revoluble scraper having a plurality of blades, the gearing, the cam operated clutch-sleeves whereby the said chambers and the said scraper are alternately rotated, substantially as and for the purposes shown and described.

6. In a dough dividing machine, the combination with the kneading and serving mechanism of a set of chambers arranged mouths outwardly about a central shaft suitably journaled, each of the said chambers having an open end, the hollow cylindrical piece possessing interior divisions corresponding to the said chambers in number and form, the said cylindrical piece being adjustable to cover and occupy more or less of the said set of chambers, the revoluble scraper having a plurality of blades and sleeves upon its operating shaft, devices effecting an engagement between the said scraper and the said cylindrical piece for preserving their relative positions, the cam operated clutch-sleeves and gearing whereby the said set of chambers and the said scraper are alternately rotated, the notched disk and spring catch adapted to insure agreement of the mouth of each chamber in turn with the vent of the dough box, and a positively driven belt so placed as to receive the portions of dough falling from the chambers, the whole substantially as and for the purposes shown and described.

In testimony whereof I affix my signature in presence of two witnesses.

JAMES W. McKAY.

Witnesses:
GEO. M. MAYER,
HENRY C. COOKE.